(12) United States Patent
Fan

(10) Patent No.: US 8,770,546 B2
(45) Date of Patent: Jul. 8, 2014

(54) BALL OR HALF-BALL VALVE WITH DRAIN-PROOF MECHANISM

(75) Inventor: Yi-Ming Fan, Taoyuan Hsien (TW)

(73) Assignee: JDV Control Valves Co., Ltd., Taipei (TW)

(*) Notice: Subject to any disclaimer, the term of this patent is extended or adjusted under 35 U.S.C. 154(b) by 0 days.

(21) Appl. No.: 13/586,887

(22) Filed: Aug. 16, 2012

(65) Prior Publication Data

US 2014/0048735 A1 Feb. 20, 2014

(51) Int. Cl.
*F16K 5/00* (2006.01)
(52) U.S. Cl.
USPC ............ 251/317; 251/315.08; 251/314
(58) Field of Classification Search
USPC ......... 251/159, 160, 170, 171, 174, 176, 180, 251/192, 315.01, 315.06, 315.08, 314, 316, 251/317
See application file for complete search history.

(56) References Cited

U.S. PATENT DOCUMENTS 3,561,730 A * 2/1971 Hurst ................. 251/315.13

* cited by examiner

*Primary Examiner* — John K Fristoe, Jr.
*Assistant Examiner* — Marina Tietjen

(57) ABSTRACT

A ball or half-ball valve with drain-proof mechanism comprises a body; inner side of the body being formed as a chamber and a through hole communicated to the chamber; an annular seat received in an annular trench of a wall of the through hole; a drain-proof unit; a valve unit installed to the inner side of the annular seat; the valve unit having an axial hole for receiving the stem; and a cover having a size corresponding to that of the through hole of the body; the cover being locked to an outer side of the through hole. The drain-proof unit has three different structures. The elements of the structures are replaceable with each other for being installed to the valve. Each mode is suitable for different environments. In the present invention, the cover can be detached easily for repairing or maintaining the elements therein. It is easy and convenient.

3 Claims, 6 Drawing Sheets

BALL OR HALF-BALL VALVE WITH DRAIN-PROOF MECHANISM

FIELD OF THE INVENTION

The present invention relates to drain-proof ball or half ball valves, in particular to a ball or half-ball valve with drain-proof mechanism.

BACKGROUND OF THE INVENTION

The prior art ball valve has a body; inner side of the body is formed as an approximate round chamber therein and a through hole communicated to the chamber. A top of the body is formed with an upper penetrating hole and a bottom thereof is a lower penetrating hole. A stem passes through the upper penetrating hole to the chamber. A valve unit is installed to the inner side of body. The opening and closing of the valve unit will control the flow to pass through the valve unit. The valve unit is a ball valve or a half-ball valve. The valve unit has an axial hole for receiving the stem. A cover has a size corresponding to that of the through hole. One side of the cover is formed with a plurality of screw holes so that the cover can be screwed to outer side of the through hole by using screws to lock the cover and the body.

However the prior art ball valve or half-ball valve is easy to make the annular seat or the stem to be destroyed or inclined, and thus the valve will over-used so as to induce drainage of flow at two sides of the valve unit.

SUMMARY OF THE INVENTION

Accordingly, the primary object of the present invention is to provide a ball or half-ball valve with drain-proof mechanism comprises a body; inner side of the body being formed as a chamber and a through hole communicated to the chamber; an annular seat received in an annular trench of a wall of the through hole; a drain-proof unit; a valve unit installed to the inner side of the annular seat; the valve unit having an axial hole for receiving the stem; and a cover having a size corresponding to that of the through hole of the body; the cover being locked to an outer side of the through hole. The drain-proof unit has three different structures. The elements of the structures are replaceable with each other for being installed to the valve. Each mode is suitable for different environments. In the present invention, the cover can be detached easily for repairing or maintaining the elements therein. It is easy and convenient.

In the first mode, the drain-proof unit includes an annular seat received in an annular trench of a wall of the through hole; an outer wall of the annular seat having a trench and an inner wall of the annular seat being formed as stepped wall; a drain-proof ring being an O ring The drain-proof ring being received in the trench of the annular seat; the drain-proof ring being elastic; a waterproof washer being an annular ring and an axial ring surface of the waterproof washer having a wave-like shape so as to provide a counterforce in clamping.

In the second mode, the drain-proof unit includes an annular seat received in the through hole; two ends of the annular seat having reduced stepped structures; a connecting ring having an inward reduced front end; the connecting ring enclosing a front end of the annular seat and being tightly engaged to an inner wall of the through hole of the body; a gap being formed between the stepped front end of the annular seat and an inner wall of the connecting ring so as to provide elasticity; a first drain-proof ring being an annular ring; a rear end of the first drain-proof ring being a V shape concave recess; in assembly, the first drain-proof ring enclosing an outer wall of the annular seat and a front side thereof resisting against a rear end of the connecting ring; a second drain-proof ring being an annular ring; a front end of the second drain-proof ring being formed as a convex V shape protrusion corresponding to the V shape concave recess of the first drain-proof ring; in assembly, the second drain-proof ring enclosing an outer wall of the annular seat and a front side thereof being engaged to the V shape concave recess of the first drain-proof ring; the second drain-proof ring being elastic; the connecting ring, the first and second drain-proof rings are made of elastic material; and an elastic ring enclosing the rear stepped reduced region of the annular seat and resisting against a rear end of the second drain-proof ring for providing a margin of deformation from other elements.

In the third mode, the drain-proof unit includes an annular seat received in the through hole; two ends of the annular seat having reduced stepped structures; the annular seat being made of metal; an inner side of a rear end of the annular seat being formed with a reduced annular recess and an outer side of a front end thereof being formed with a stepped structure;

The various objects and advantages of the present invention will be more readily understood from the following detailed description when read in conjunction with the appended drawing.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
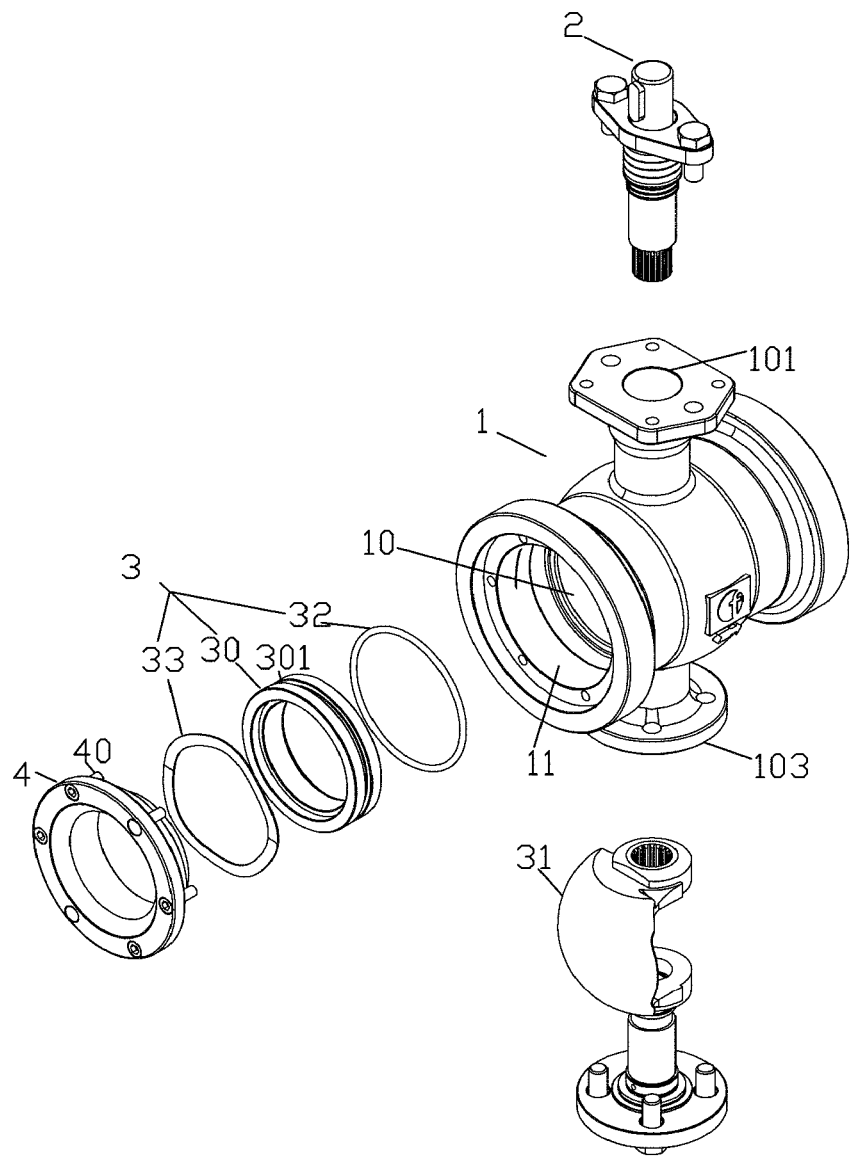
FIG. 1 is a perspective view of the first embodiment of the present invention.
Figure 2:
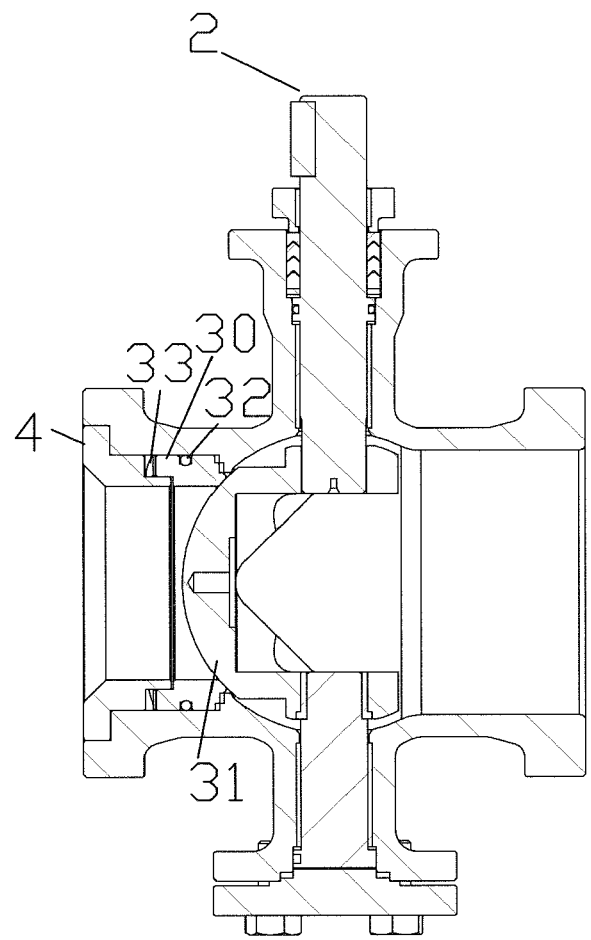
FIG. 2 is a cross sectional view of the first embodiment of the present invention.

Referring to FIGS. 1 and 2, the structure of the present invention will be described herein.

A body 1 is included. An inner side of the body 1 is formed as an approximate round chamber 10 therein and a through hole 11 communicated to the chamber 10. A top of the body 1 is formed with an upper penetrating hole 101 and a bottom thereof is formed with a lower penetrating hole 103.

A stem 2 passes through the upper penetrating hole 101 to the chamber 10. A top end of the stem 2 may be connected to an operating unit (not shown) for driving the stem 2 to rotate.

A drain-proof unit 3 has the following elements.

An annular seat 30 is received in an annular trench of a wall of the through hole 11. An outer wall of the annular seat 30 has a trench 301 and an inner wall of the annular seat 30 is formed as stepped wall.

A drain-proof ring 32 is an O ring and is made of silica gel or graphite or PTEF. The drain-proof ring 32 is received in the trench 301 of the annular seat 30. The drain-proof ring 32 is elastic.

A waterproof washer 33 is an annular ring and an axial ring surface of the waterproof washer 33 has a wavelike shape so as to provide a counterforce in clamping. Generally, the waterproof washer 33 is made of metal material. When the waterproof washer 33 deforms, since the drain-proof ring 32 has preferred elasticity, it provides a preferred water sealing effect.

A valve unit 31 is installed to the inner side of the annular seat 30. The opening and closing of the valve unit 31 will control the flow to pass through the valve unit 31. In the present invention, the valve unit 31 is a ball valve or a half-ball valve. The valve unit 31 has an axial hole for receiving the stem 2.

A cover 4 has a size corresponding to that of the through hole 11 of the body 1. One side of the cover 4 is formed with a plurality of screw holes so that the cover 4 can be screwed to an outer side of the through hole 11 by using screws 40 to lock the cover and the body 1. The outer side of the cover 4 has a stepped structure so that after assembly, an outer side and an inner side near a center of the through hole 11 of the waterproof washer 33 is enclosed by the cover 4.

With reference to FIG. 2, the assembly of the present invention is described herein. In assembly the drain-proof ring 32 is installed to the trench 301 of the annular seat 30; then the annular seat 30 is placed in the through hole 11; then the waterproof washer 33 is installed to an outer side of the annular seat 30; then the cover 4 is installed to the outer side of the waterproof washer 33. In assembly state, since the waterproof washer 33 has a wavelike structure, it can generate a counterforce to enhance the force for clamping the waterproof washer 33. Further, the wavelike structure will form gaps to reduce the twisting force for rotating the valve. Moreover, the waterproof washer 33 is low cost, compact size and light weighted, and have the effect of drain proof.

Figure 3:
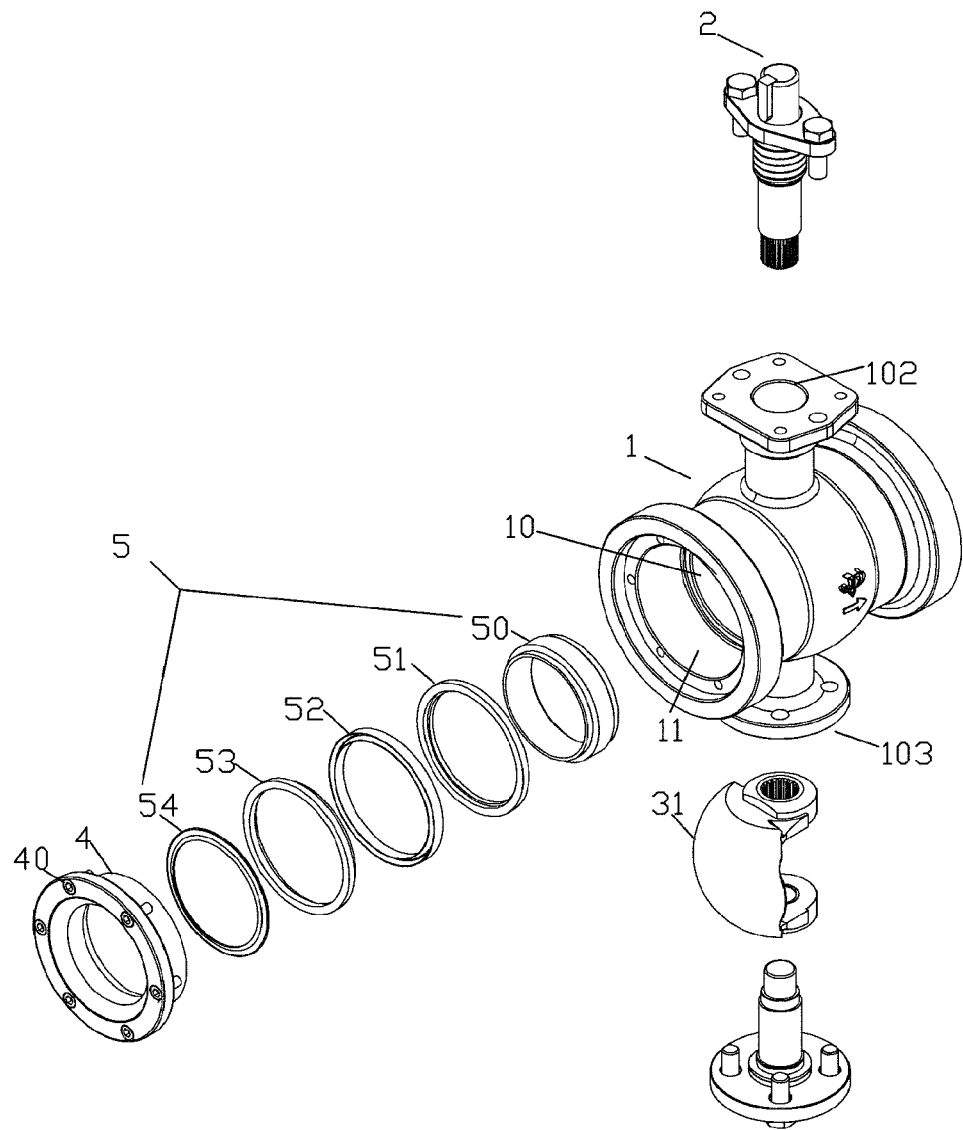
FIG. 3 is a perspective view of the second embodiment of the present invention.

In the following, the second embodiment of the present invention will be described herein with reference to FIGS. 3 and 4. In this embodiment, only the drain-proof unit is changed. Other elements are identical to the above mentioned structure.

A body 1 is included. An inner side of the body 1 is formed as an approximate round chamber 10 therein and a through hole 11 communicated to the chamber 10. A top of the body 1 is formed with an upper penetrating hole 101 and a bottom thereof is formed with a lower penetrating hole 103.

A stem 2 passes through the upper penetrating hole 101 to the chamber 10. A top end of the stem 2 may be connected to an operating unit (not shown) for driving the stem 2 to rotate.

A drain-proof unit 5 has the following elements.

An annular seat 50 is received in the through hole 10. Two ends of the annular seat 50 have reduced stepped structures. The annular seat 50 is made of metal.

A connecting ring 51 has an inward reduced front end; encloses a front end of the annular seat 50 and is tightly engaged to an inner wall of the through hole 11 of the body 1. A gap is formed between the stepped front end of the annular seat 50 and an inner wall of the connecting ring 51 so as to provide elasticity. The connecting ring 51 is made of elastic material, such as silica gel, graphite or PTEF.

A first drain-proof ring 52 is an annular ring. A rear end of the first drain-proof ring 52 is a V shape concave recess 520. The second drain-proof ring 52 is made of elastic material, such as silica gel, graphite or PTEF. In assembly, the first drain-proof ring 52 encloses the outer wall of the annular seat 50 and a front side thereof resists against a rear end of the connecting ring 51.

A second drain-proof ring 53 is an annular ring. A front end of the second drain-proof ring 53 is formed as a convex V shape protrusion 530 corresponding to the V shape concave recess 520 of the first drain-proof ring 52. The second drain-proof ring 53 is made of elastic material, such as silica gel, graphite or PTEF. In assembly, the second drain-proof ring 53 encloses the outer wall of the annular seat 50 and a front side thereof is engaged to the V shape concave recess 520 of the first drain-proof ring 52.

The second drain-proof ring 53 is elastic. When it is compressed, it is extendible so that all the elements of the drain-proof unit 5 are tightly engaged.

An elastic ring 54 encloses the rear stepped reduced region of the annular seat 50 and resists against a rear end of the second drain-proof ring 53 for providing a margin of deformation from other elements.

A valve unit 31 is installed to the inner side of the annular seat 30. The opening and closing of the valve unit 31 will control the flow to pass through the valve unit 31. In the present invention, the valve unit 31 is a ball valve or a half-ball valve. The valve unit 31 has an axial hole for receiving the stein 2.

A cover 4 has a size corresponding to that of the through hole 11. One side of the cover 4 is formed with a plurality of screw holes so that the cover 4 can be screwed to outer side of the through hole 11 by using screws 40 to lock the cover and the body 1.

Figure 4:
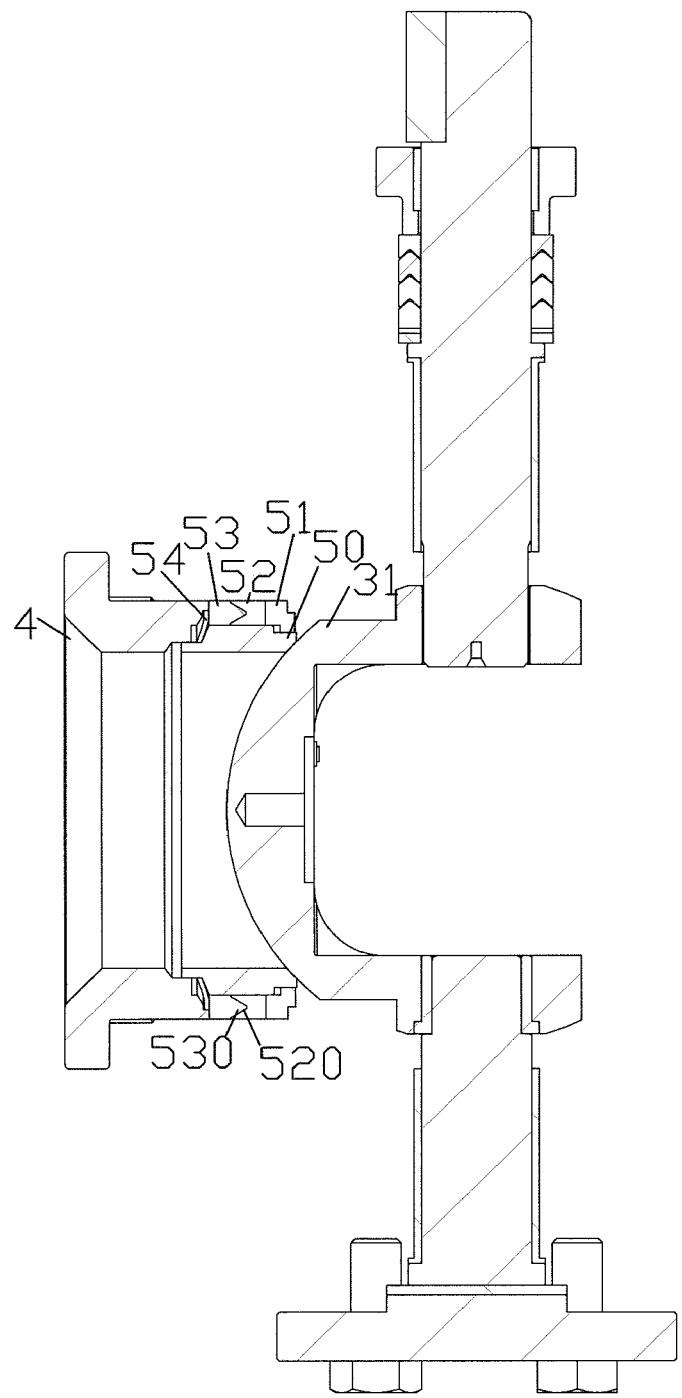
FIG. 4 is a cross sectional view of the second embodiment of the present invention.

Referring to FIG. 4, the assembly of the second embodiment of the present invention is illustrated. The annular seat 50 is received in the through hole 10. A stein 2 passes through the upper penetrating hole 101 to the chamber 10. The valve unit 31 is installed to the inner side of the annular seat 30. The opening and closing of the valve unit 31 will control the flow to pass through the valve unit 31. The stem 2 further passes through the axial hole of the valve unit 31. The connecting ring 51 encloses a front end of the annular seat 50 and is tightly engaged to an inner wall of the through hole 11 of the body 1. The second drain-proof ring 53 encloses the outer wall of the annular seat 50 and a front side thereof is engaged to the V shape concave recess 520 of the first drain-proof ring 52. The V shape structures of the first and second drain-proof rings causes a well sealing effect therebetween. The gap between the stepped front end of the annular seat 50 and an inner wall of the connecting ring 51 provides elasticity for reducing the twisting force in rotation of the valve unit 31.

Furthermore, all elements of the present invention are tightly engaged without falling out and has no drainage in operation. Furthermore, the structure is benefit in manufacturing, selling and maintenance.

Figure 5:
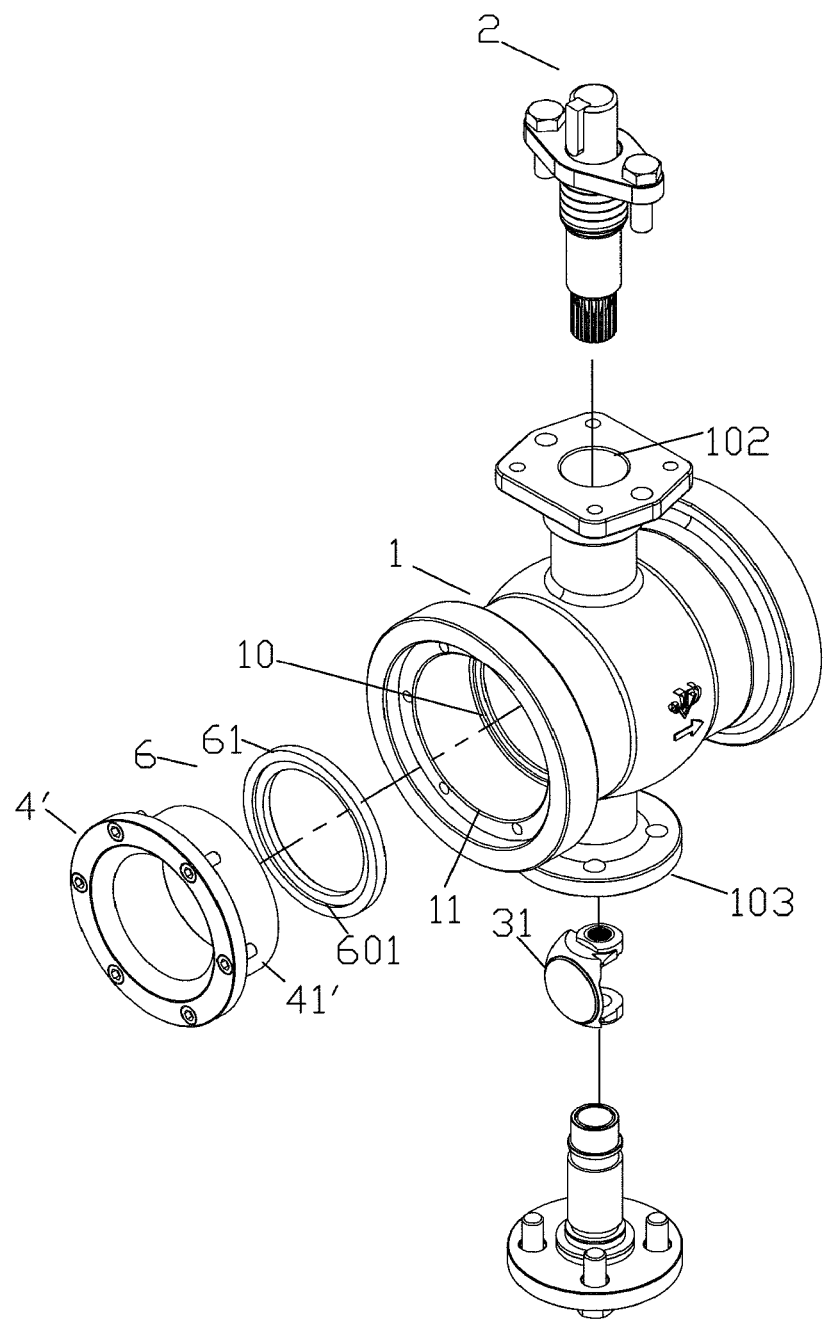
FIG. 5 is a perspective view of the third embodiment of the present invention.
Figure 6:
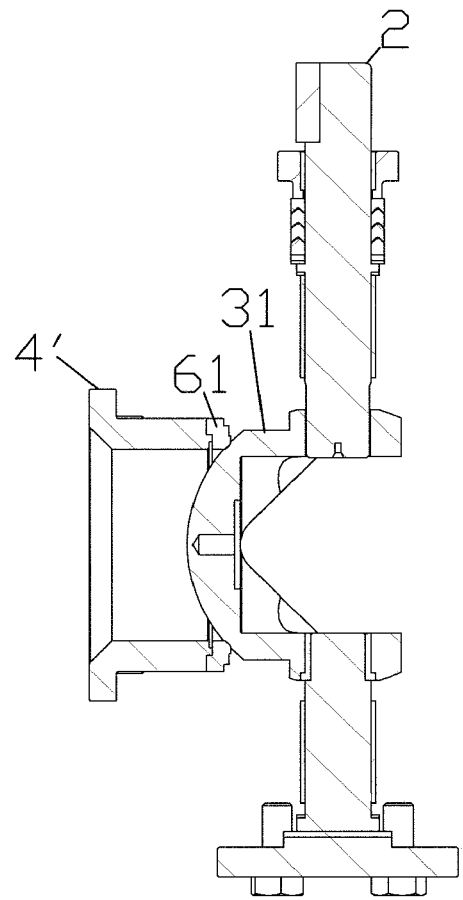
FIG. 6 is a perspective view of the third embodiment of the present invention.

In the following, the third embodiment of the present invention will be described herein with reference to FIGS. 5 and 6. In this embodiment, only the drain-proof unit is changed. Other elements are identical to the above mentioned structure.

A body 1 is included; inner side of the body 1 is formed as an approximate round chamber 10 therein and a through hole 11 communicated to the chamber 10. A top of the body 1 is formed with an upper penetrating hole 101 and a bottom thereof is formed with a lower penetrating hole 103.

A stem 2 passes through the upper penetrating hole 101 to the chamber 10. A top end of the stem 2 may be connected to an operating unit (not shown) for driving the stem 2 to rotate.

A drain-proof unit 6 has the following elements.

An annular seat 61 is received in the through hole 10. Two ends of the annular seat 50 have reduced stepped structures. The annular seat 50 is made of metal. An inner side of a rear end of the annular seat 61 is formed with a reduced annular recess 601 and an outer side of a front end thereof is formed with a stepped structure.

A valve unit 31 is installed to the inner side of the annular seat 61. The opening and closing of the valve unit 31 will control the flow to pass through the valve unit 31. In the present invention, the valve unit 31 is a ball valve or a half-ball valve. The valve unit 31 has an axial hole for receiving the stem 2.

A cover 4' has a size corresponding to that of the through hole 11. An outer rear end of the cover 4' is formed with an annular flange 41' which is received in the annular recess 601 of the annular seat 61. One side of the cover 4' is formed with a plurality of screw holes so that the cover 4 can be screwed to outer side of the through hole 11 by using screws 40 to lock the cover and the body 1.

The drain-proof unit of the present invention has three different structures. The elements of the structures are replaceable with each other for being installed to the valve. Each mode is suitable for different environments. In the present invention, the cover can be detached easily for repairing or maintaining the elements therein. It is easy and convenient.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A ball or half-ball valve with drain-proof mechanism, comprising:
    a body; an inner side of the body being formed as an approximate round chamber and a through hole communicated to the chamber; a top of the body being formed with an upper penetrating hole and a bottom thereof being formed with a lower penetrating hole;
    a stem passing through the upper penetrating hole to the chamber; a top end of the stem being connected to an operating unit for driving the stem to rotate;
    an annular seat received in the through hole; a front end and a rear end of the annular seat having reduced stepped structures;
    a connecting ring having an inward reduced front end; the connecting ring enclosing a front end of the annular seat and being tightly engaged to an inner wall of the through hole of the body; a gap being formed between the stepped front end of the annular seat and an inner wall of the connecting ring so as to provide elasticity;
    a first drain-proof ring being an annular ring; a rear end of the first drain-proof ring being a V shape concave recess; in assembly, the first drain-proof ring enclosing an outer wall of the annular seat and a front side thereof resisting against a rear end of the connecting ring;
    a second drain-proof ring being an annular ring; a front end of the second drain-proof ring being formed as a convex V shape protrusion corresponding to the V shape concave recess of the first drain-proof ring; in assembly, the second drain-proof ring enclosing an outer wall of the annular seat and a front side thereof being engaged to the V shape concave recess of the first drain-proof ring; the second drain-proof ring being elastic;
    the connecting ring, the first and second drain-proof rings being made of elastic material;
    an elastic ring enclosing the stepped rear end of the annular seat and resisting against a rear end of the second drain-proof ring;
    a valve unit being installed to the inner side of the annular seat; the valve unit having an axial hole for receiving the stem; and
    a cover having a size corresponding to that of the through hole; and the cover being locked to an outer side of the through hole.

2. The ball or half-ball valve with drain-proof mechanism as claimed in claim 1, wherein the annular seat is made of metal; the connecting ring, the first and second drain-proof rings are made of elastic material, silica gel, graphite or PTEF.

3. The ball or half-ball valve with drain-proof mechanism as claimed in claim 1, wherein one side of the cover is formed with a plurality of screw holes so that the cover is screwed to an outer side of the through hole by using screws to lock the cover and the body.

* * * * *